United States Patent
Dreher et al.

(10) Patent No.: US 11,460,361 B2
(45) Date of Patent: Oct. 4, 2022

(54) VALIDATION APPARATUS FOR VALIDATING A FORCE TESTING MACHINE, METHOD OF VALIDATING A FORCE TESTING MACHINE AND METHOD OF MEASURING FORCES

(71) Applicant: HOFFMANN-LA ROCHE INC., Little Falls, NJ (US)

(72) Inventors: Sascha Dreher, Basel (CH); Martin Vogelmann, Basel (CH); Thorben Hammerich, Basel (CH); Eva Conraths, Basel (CH); Paolo Moroni, Basel (CH); Georg Cramm, Basel (CH)

(73) Assignee: HOFFMAN-LA ROCHE INC., Little Falls, NJ (US)

( * ) Notice: Subject to any disclaimer, the term of this patent is extended or adjusted under 35 U.S.C. 154(b) by 61 days.

(21) Appl. No.: 16/769,403

(22) PCT Filed: Dec. 7, 2018

(86) PCT No.: PCT/EP2018/083923
§ 371 (c)(1),
(2) Date: Jun. 3, 2020

(87) PCT Pub. No.: WO2019/110778
PCT Pub. Date: Jun. 13, 2019

(65) Prior Publication Data
US 2021/0172815 A1    Jun. 10, 2021

(30) Foreign Application Priority Data

Dec. 7, 2017 (EP) .................................... 17206008

(51) Int. Cl.
*G01L 5/00* (2006.01)

(52) U.S. Cl.
CPC .................................. *G01L 5/0028* (2013.01)

(58) Field of Classification Search
CPC .................................. G01L 5/0028; B01L 3/02
See application file for complete search history.

(56) References Cited

U.S. PATENT DOCUMENTS 6,105,230 A * 8/2000 Balestracci ............... B67B 7/02
29/235
2015/0343148 A1 12/2015 Marmey
(Continued)

FOREIGN PATENT DOCUMENTS

CN           105398821 A        3/2016

OTHER PUBLICATIONS

International Search Report dated Jan. 3, 2019 in International Appln. No. PCT/EP2018/083923.

*Primary Examiner* — Freddie Kirkland, III
(74) *Attorney, Agent, or Firm* — Medler Ferro Woodhouse & Mills PLLC

(57) ABSTRACT

A force testing machine (FTM) validation apparatus is disclosed for validating a test process involving a force testing machine to measure forces involved in operation of a syringe arrangement. Particularly a syringe arrangement that includes a staked-in needle prefilled syringe and a needle safety device cooperating with the staked-in needle prefilled syringe. The FTM validation apparatus includes a syringe arrangement surrogate, and a holder arranged to support the syringe arrangement surrogate in a predefined position and orientation in the force testing machine. The syringe arrangement surrogate includes a break loose part arranged to mimic a break loose force of the syringe arrangement and an injection force part arranged to mimic an injection force of the syringe arrangement. Methods are also disclosed for validating a test process that measures (Continued)

forces involved in operation of a syringe arrangement and for measuring forces involved in operation of the syringe arrangement.

20 Claims, 7 Drawing Sheets

(56) References Cited

U.S. PATENT DOCUMENTS

2019/0050375 A1* 2/2019 Fitzgibbon ............ A61M 5/315
2020/0338269 A1* 10/2020 Jazayeri ................ G01L 5/0052

* cited by examiner

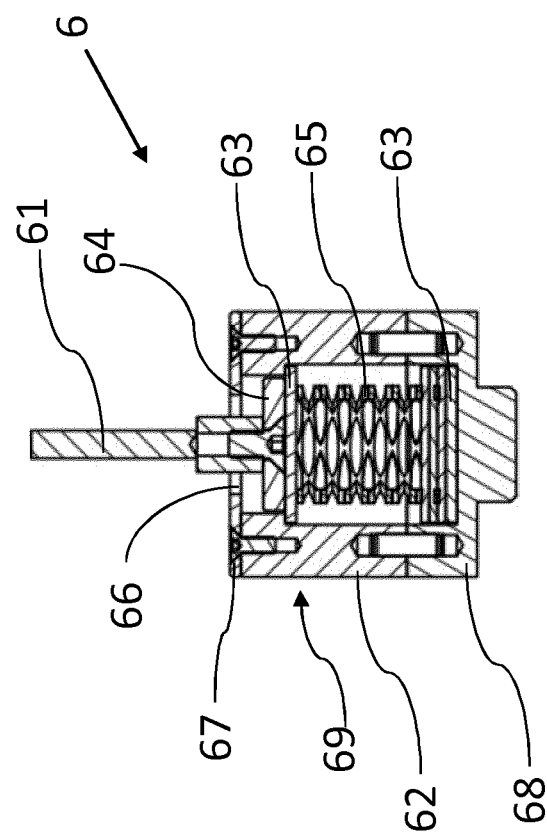
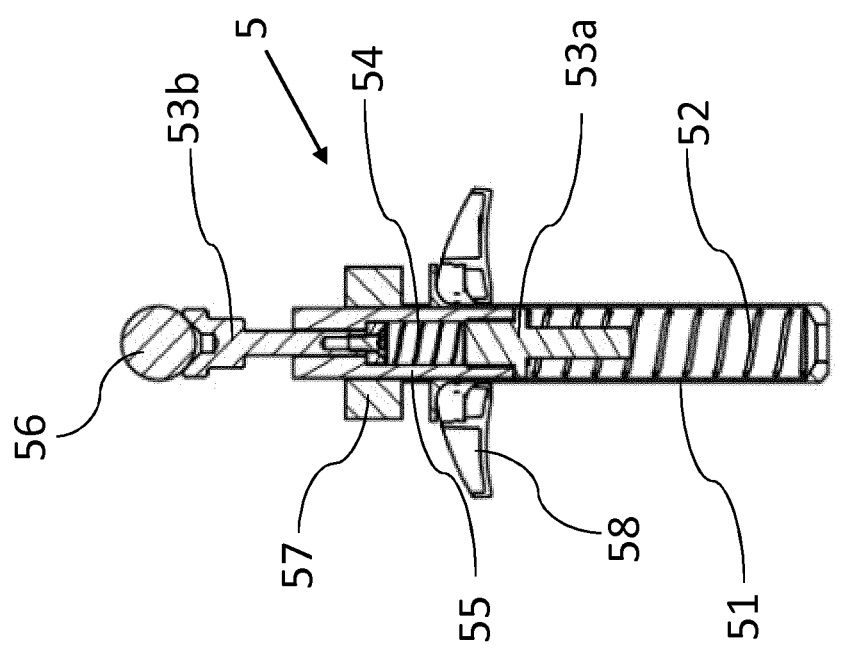
Fig. 5
Fig. 4

VALIDATION APPARATUS FOR VALIDATING A FORCE TESTING MACHINE, METHOD OF VALIDATING A FORCE TESTING MACHINE AND METHOD OF MEASURING FORCES

TECHNICAL FIELD

The present invention relates to a validation apparatus for validating a test process involving a force testing machine (FTM) to measure forces involved in operation of a syringe arrangement. Syringe arrangements may comprise a pre-filled syringe provided with a staked-in needle and a needle safety device. The present invention also relates to a method of validating a test process involving a FTM to measure forces involved in operation of a syringe arrangement, by employing such a FTM validation apparatus, as well as to a method of measuring forces involved in operation of a syringe arrangement, wherein the measuring process has been validated by the aforementioned validating method.

Such validation apparatus and methods can be used for ensuring that the test equipment and test process deployed in connection with the development and the manufacturing of a syringe arrangement is reliable and yields consistent results which accurately and precisely reflect the operational reality of the syringe arrangement being tested.

BACKGROUND ART

In general, pharmaceutical, biotechnological and medical products are strictly regulated to ensure that they are fit for the intended use and that they do not have inappropriate side effects. Not only the products, but also related processes need to comply with quality assurance programs to prevent mistakes or defects in manufactured products and avoiding issues when delivering solutions or services to customers. In particular, in the context of pharmaceutical or medical industries, it typically is of paramount importance that products, devices and processes consistently and reliably produce expected results. For ensuring this, usually processes and/or products or devices are validated.

The term "validation" as used herein relates to confirming by objective evidence that requirements or conditions of a specific application or a specific use are met. It typically involves production of documented evidence that a process carried out, e.g. in testing, maintains at all stages the desired level of compliance with pre-established specifications. The outcome of a stable, validated process should then be, invariably, the production of a product which is, in real life, capable to perform the task as intended and declared. Validation is a requirement of food, drug and pharmaceutical regulating agencies such as the United States Food and Drug Administration (FDA). Good manufacturing practices guidelines issued by such agencies stipulate that a set of independent procedures be carried out to check if a final product will meet predetermined specifications and requirements of its intended purposes and will consistently perform within a given range. Validation is therefore essential to receive product approval by regulating agencies.

Validation may also encompass the qualification of systems and equipment employed for developing, testing and manufacturing a final pharmaceutical product. In precision instruments, laboratory equipment or specialized machinery, even minor inaccuracies can cause problems and lead to incomplete, contradictory or erroneous results. In particular, an incorrect system of validating a test equipment can lead to false assumptions, eventually resulting in the impossibility to adhere to industry norms and obtain a product fit for the intended use.

Typically, quality assurance is also required for the operation of syringe arrangements such as ready-to-use prefilled syringes. Thereby, forces involved when using such syringe arrangements during injection are important for their secure and accurate operation. For example, when a force to be applied by a user to advance a plunger of the syringe arrangement is too high such operation may be difficult or inaccurate and appropriate delivery quality cannot be assured. Therefore, such injection forces are measured wherein test processes involving a FTM and auxiliary equipment are often used.

However, it has been shown that known test processes often are not fully reliable and their accuracy is affected by the inhomogeneity in behaviour of the syringe arrangements used for testing. Furthermore, such test processes typically also have to be validated. However, since conventional testing on a multiplicity of actual product units, i.e. of single syringe arrangements, is by definition destructive and a new product unit is needed at every repeated test, such validation of the test process might be resource consuming and costly.

Therefore, there is a need for a validation apparatus allowing to repeatedly provide reliable and robust test data which realistically reflect the measuring of forces involved in testing operation of a syringe arrangement. There is also a concurrent need for validating more accurate test processes involving FTM in connection with the operation of a syringe arrangement.

DISCLOSURE OF THE INVENTION

According to the invention this need is settled by a force testing machine (FTM) validation apparatus as it is defined by the features of independent claim 1, by a method of validating a test process involving a force testing machine as it is defined by the features of independent claim 19, and by a use as it is defined by the features of independent claim 20. Preferred embodiments are subject of the dependent claims.

In one aspect, the present invention relates to a force testing machine (FTM) validation apparatus for validating a test process involving a force testing machine. In the particular context of the invention the term "validation" can be more specifically be understood as a confirmation that the FTM validation apparatus and the associated test process reproducibly simulate the characteristics in the form of functions of the syringe arrangement in application. The FTM is in particular to be used to measure forces involved in operation of a syringe arrangement. The FTM validation apparatus is especially conceived to be used for validating a test process involving a FTM for measuring forces during the operation of syringe arrangements, particularly comprising staked-in needle (SIN) prefilled syringes (PFS) and needle safety devices cooperating with the SIN PFS.

The FTM validation apparatus according to the present invention comprises a syringe arrangement surrogate and a holder arranged to support the syringe arrangement surrogate in a predefined position and orientation in the FTM. The holder is advantageously also used in the validated testing process for accurately positioning the syringe arrangement to be tested. Thus, the holder typically does form part of the validated process or system.

The syringe arrangement surrogate is configured to simulate, or mimic, a standardized or other embodiment of a syringe arrangement. The syringe arrangement can, for instance, comprise a syringe such as a staked-in needle prefilled syringe (SIN PFS) dimensioned to administer 1.0 milliliter or 2.25 milliliters of a pharmaceutical substance.

In the FTM validation apparatus, the syringe arrangement surrogate comprises a break loose part, arranged to mimic a break loose force of the syringe arrangement, and an injection force part, arranged to mimic an injection force of the syringe arrangement.

In the context of the present invention, the term "prefilled syringe", abbreviated by the acronym PFS, relates to a syringe, whose barrel is filled with a given dosage of pharmaceutical or drug substance. Such prefilled syringe may be provided with a staked-in needle (SIN) or an adaptor to be connected with a suitable needle before application.

The term "drug" as used herein relates to a therapeutically active agent, also commonly called active pharmaceutical ingredient (API), as well as to a combination of plural such therapeutically active substances. The term also encompasses diagnostic or imaging agents, like for example contrast agents (e.g. MRI contrast agents), tracers (e.g. PET tracers) and hormones, that need to be administered in liquid form to the patient.

The term "drug substance" or "pharmaceutical substance" as used herein relates to a drug as defined above formulated or reconstituted in a form that is suitable for administration to the patient. For example, besides the drug, a drug substance may additionally comprise an excipient and/or other auxiliary ingredients. A particularly preferred drug substance in the context of the invention can be a drug solution, in particular a solution for, e.g. subcutaneous, intramuscular, intradermal or intravitreal, injection via the syringe arrangement.

The term "drug product" as used herein relates to a finished end product comprising a drug substance or a plurality of drug substances. In particular, a drug product may be a ready to use product having the drug substance in an appropriate dosage and/or in an appropriate form for administration. For example, a drug product may include an administration device such as a syringe arrangement or a prefilled syringe or the like.

A syringe arrangement or syringe can be thought in more generic terms as a medicament delivery system, which can in principle be both manually operated—as in a conventional syringe—or automatically operated, for administering an appropriate dosage of prefilled pharmaceutical substance in the body of human or animal patients. In the present context, a syringe or syringe arrangement can also take the form of automatic injection devices, housing a container preventively filled with a pharmaceutical substance, which, when operated, causes the container to move in a proximal direction towards a delivery site of the patient and a needle on the container to project out of the device housing to inject the therapeutic agent into a patient's body. This automatism is typically achieved by a mechanism, which, when triggered by an operator, automatically executes the delivery of the drug to the patient. Therefore, the term "syringe" may also encompass injection devices intended for self-administration by patients, or for administration by less experienced personnel, such as auto-injection devices. These devices are expressly designed to overcome manipulation and safety difficulties associated with administration of a drug through a needle-based delivery device by unskilled operators.

In preferred embodiments, the syringe arrangement comprises or is a staked-in needle prefilled syringes (SIN PFS). Such SIN PFS have shown to be comparably convenient to handle and use. In such syringes the pharmaceutical substance is provided in the interior of the syringe in a solved or other liquid form ready for being applied. Like this, the user receives a ready-to-inject syringe, without the requirement to fill the pharmaceutical solution into the syringe or to manually assemble the needle to the syringe body. The occurrence of injuries or inappropriate handling during application can thereby be minimized.

Usually, SIN PFS comprise of a syringe body, a staked-in needle and a rigid needle shield (RNS). The RNS can be the closure of the needle which aims for preventing accidental stick injuries, leaking of pharmaceutical substance and entry of contaminations. Commonly, RNS have an inner elastomeric part which is adjacent to and incorporates the needle and an outer solid part which can be made of a thermoset plastic material or the like.

Moreover, when generally operating syringes, the break loose force is the force required to overcome the static friction of a stopper of a plunger of a syringe in a syringe arrangement and to start moving the plunger from its storage extended position. First, it is necessary to overcome the resistance between a barrel of the syringe and a stopper of the plunger sliding along the barrel, to move the plunger head. By way of example, if the break loose force increases too much, the spring in an auto-injector incorporated in the syringe arrangement may not be able to overcome resistance induced by it, so that the injection cannot start.

Further, in operation of syringes, injection force is the force required to maintain or sustain the movement of the plunger of a syringe or syringe arrangement, once the static friction has been overcome, in order to expel the content of the syringe. As the plunger stopper moves down the syringe barrel, it encounters friction resistance until the syringe barrel is emptied. This resistance can be part of the injection force or gliding force. Increased injection force can slow the motion of the plunger to the point that the injection time is unacceptably long and, in the worst-case scenario, it can stall the plunger and prevent the complete dosage from being delivered. More specifically, the injection force may be the result of plural force components: the abovementioned friction between the plunger stopper and the internal walls of a syringe body, or barrel; the fluid dynamic resistance, or drag, exerted by the pharmaceutical substance, located inside the syringe body and to be administered, on account of its viscosity; the resistance to be overcome for transferring the substance through a needle of comparably small diameter; etc. It can also comprise a component of an initially different force to be applied due to an air to be compressed before delivery of the drug substance. Thus, the injection force typically depends on a plurality of parameters such as viscosity of the substance, inner diameter of the needle, barrel, presence and size of an air bubble etc. The injection force can be lower, the same or, in some cases, also higher than the break loose force.

The holder of the FTM validation apparatus can be integral with the syringe arrangement surrogate, e.g. it can be composed of particular means or features embodied at or within the syringe arrangement surrogate. Advantageously, the holder of the FTM validation apparatus is, or comprises, a construction separate or separable from the syringe arrangement surrogate.

In particular, the holder may connect, on one side, to the force testing machine and, on the other side, to a part of the syringe arrangement or its surrogate.

The FTM validation apparatus according to the invention allows for efficiently and accurately validating a test process in which a FTM is used for testing syringe arrangements or pharmaceutical products having syringe arrangements. Thereby, by providing the FTM validation apparatus with the injection force part as well as the break loose force part allows for an improved mimicking of the forces involved in operation of the syringe arrangement. Like this, the operation of the syringe arrangement can be better simulated such that the validation can be more accurate and reliable. Furthermore, the FTM validation apparatus allows for preventing waste of syringe arrangements or pharmaceutical products during validation and tuning of the test process.

Preferably, the syringe arrangement surrogate comprises a support structure which can be mounted to the holder. The mounting of the support structure can be such that a predefined distance is established between the surrogate or a specific portion thereof and the holder.

Preferably, the support structure is adjustable to accommodate differently dimensioned syringe arrangement surrogates which are configured to simulate corresponding differently dimensioned syringe arrangements. Thus, the behavior of different sizes and types of syringes can be simulated. Also, the support structure may be configured so that back pressure forces coming from the underlying injection force part are compensated. Furthermore, an anti-rotation feature may be incorporated in the support structure, such that under load the carrier is prevented from slipping from the grip of the support structure. Such an anti-rotation feature may be conferred by a slider mechanism or similar, blocking the relative rotation of support structure and carrier.

Preferably, the break loose part of the syringe arrangement surrogate has a carrier and a distal plunger movable relative to the carrier in an axial direction. In this case, the distal plunger may be connected to the carrier such that it is releasable by applying a force corresponding to the break loose force of the syringe arrangement. The axial direction may be the general direction of movement of the distal plunger and may correspond to the general longitudinal direction along which the overall force testing machine validation apparatus extends. The syringe arrangement surrogate and the holder may extend along a substantially same longitudinal or axial direction.

In connection with the invention, the term "distal" relates to a direction directed away from a body or person to which the syringe arrangement, which is represented by the syringe arrangement surrogate, would be applied. Analogously, the term "proximal" relates to a direction towards the body or person to which the syringe arrangement, which is represented by the syringe arrangement surrogate, would be applied. For example, in embodiments of syringe arrangements having a needle intended to be pierced in the body or person and a plunger to be pushed for delivering a substance through the needle, the proximal end is formed by a tip of the needle and the distal end is formed by the section of the plunger to be pushed.

Preferably, when the break loose part of the syringe arrangement surrogate has a carrier as above described, the support structure of the syringe arrangement surrogate fixedly holds the carrier and is mountable in relation to the injection force part. The mounting of the support structure is preferably such that a predefined correlation is established between the break loose part and the injection force part, suitable to simulate a given syringe arrangement with certain standardized characteristics and dimensions.

Preferably, the carrier of the break loose part of the syringe arrangement surrogate is equipped with a first magnetic element and the distal plunger of the same break loose part of the syringe arrangement surrogate has a second magnetic element. Thus, the distal plunger is connected to the carrier by a magnetic force acting between the first magnetic element and the second magnetic element.

In particular, one of the first and second magnetic elements can be or comprise a magnet and the other one of the first and second magnetic element can be made of a magnetic material such as an appropriate metal or the like, such that the abovementioned magnetic force can be exerted therebetween. In such embodiments having first and second magnetic elements, the magnetic force can be substantially equivalent, or proportional, to the break loose force of the syringe arrangement which is being simulated via the syringe arrangement surrogate. When the FTM applies a force on the distal plunger, such magnetic force has to be overcome in order to allow a further operation of the syringe arrangement surrogate. This allows for suitably mimicking the break loose force of the corresponding syringe arrangement. By way of example, the distal plunger can incorporate a metal disc and the carrier can be provided with an array of cylindrical magnets or similar, possibly accommodated into the body of the carrier in dedicated recesses. The design of the break loose part is such that, for the distal plunger to be detached from the carrier, the FTM validation apparatus needs to apply a break loose force greater than the magnetic force existing between the metal disc and the carrier.

Preferably, the break loose part of the syringe arrangement surrogate comprises an adjustable spacer structure arranged between the first magnetic element of the carrier and the second magnetic element of the distal plunger. By the provision of such a spacer structure, a distance between the first magnetic element of the carrier and the second magnetic element of the distal plunger is adjustably predefinable. Such a spacer structure allows for efficiently tailoring the FTM validation apparatus to the situation given in the syringe arrangement to be mimicked. Thereby, the spacer structure can comprise a set of plates or sheets, for instance Mylar discs, arrangeable between the first and second magnetic elements. By placing an appropriate amount of plates or sheets between the magnetic elements, an adjustment of the distance between the first and second magnetic elements is enabled and, as a consequence, the magnetic force therebetween can be accurately defined. Additionally, or alternatively, the plates or sheets may be embodied with differing width such that a plate or sheet having an appropriate width can be chosen for adjusting the magnetic force.

Furthermore, the break loose part of the syringe arrangement surrogate may comprise a distal sleeve displaceably arranged in the carrier, wherein the distal plunger axially extends through distal sleeve when being connected to the carrier. Such a distal sleeve can allow for better holding and guiding of the distal plunger. Advantageously, the distal sleeve comprises a bore or a through hole extending in the axial direction, through which the distal plunger is arranged.

The injection force part of the syringe arrangement surrogate preferably comprises a spring, an outer sleeve housing the spring and an intermediate plunger assembly extending into the outer sleeve. In particular, a first rod member of the intermediate plunger assembly may be movable relative to the outer sleeve in an axial direction and the spring may be arranged to be deformed when the first rod member is moved in the axial direction into the outer sleeve.

In the context of the present application, the term "spring" can relate to any element suitable for providing a resilient force when being elastically deformed such as bent, compressed or the like. Typically, springs are elastic elements such that, once deformed, they tend to get back to their original form or shape. Thereby, they provide a force on any means hindering them to do so. In a simple and efficient embodiment, the spring can be a helical spring.

Moreover, the injection force part may comprise a further spring, an inner sleeve housing the further spring and a second rod member extending into the inner sleeve. In this case, the second rod member can be made movable relative to the inner sleeve in the axial direction and the further spring can be arranged to be deformed when the second rod member is moved in the axial direction into the inner sleeve.

Analogously to the case of the first rod movement, the term "deformed" in this connection can particularly relate to the spring being compressed, bent or the like.

Such an arrangement allows for accurately simulating the situation given in many syringe arrangements. For example, one of the springs can be embodied to represent a friction between a plunger or a stopper thereof and a syringe body or barrel. Additionally, the same springs together with the associated structures allow for mimicking an air bubble in the syringe arrangement which has to be compressed before delivery of the substance starts. The other one of the springs can represent the behavior of the substance to be delivered, which may depend on properties of the substance such as its viscosity or the like.

In a specific embodiment, the spring-contrasted action of the first rod member of the intermediate plunger assembly when moving relative to the outer sleeve can advantageously mimic the viscosity-related fluid dynamic resistance, or drag, exerted by the pharmaceutical substance located inside the syringe body or barrel. Conversely, the spring-contrasted action of the second rod member when moving relative to the inner sleeve can advantageously mimic the above friction between a plunger, or a stopper thereof, and the syringe body or barrel, and/or the compression of an air bubble within the syringe arrangement.

It is possible that, for specific embodiments of the invention, the second rod member moves relative to the inner sleeve before the first rod member starts moving relative to the outer sleeve. The movement of the first rod member can actually be induced by an advancement of the second rod member and triggered by the establishing of a consequent contact between the second and the first rod member. Preferably, the inner sleeve is made slidable within the outer sleeve.

In particular embodiments, the first and second rod members of the intermediate plunger assembly are designed to come to engage each other, after the second rod member has slid axially towards the first rod member. After engaging, the first and the second rod members can move as one integral piece, as the first rod member further slides along the outer sleeve until it contacts a component of a needle safety device activation force part.

Preferably, the intermediate plunger assembly is equipped with a rounded or essentially spherical distal end portion. Particularly, the intermediate plunger assembly preferably comprises a ball lying on the second rod member thereby forming the rounded distal end portion. The ball can, e.g. have a diameter of 12 millimeter and be loosely or movably held in a respective concave recess of the second rod member. Such rounded distal end portion allows for simulating a human interface, such as a finger or the like. Thus, the rounded distal end portion allows for balancing deviations or inclinations of the syringe plunger, following the manipulation by an individual making use of the simulated syringe arrangement.

For this purpose, the distal end portion of the intermediate plunger assembly of the injection force part preferably contacts a proximal end of the distal plunger of the break loose part, when the holder supports the syringe arrangement surrogate in the predefined position and orientation in the force testing machine.

A third, additional part of the syringe arrangement surrogate of the FTM validation apparatus according to the present invention may preferably comprise a needle safety device activation force part, arranged to mimic a needle safety device activation force of the syringe arrangement.

In connection with the invention, the term "needle safety device", abbreviated by the acronym NSD, relates to an arrangement which protects a user or operator of the syringe from the needle. A NSD typically comprises a sleeve covering the needle, after the syringe has been used. For example, pushing a plunger rod of the syringe for administering a prefilled medicament, or drug substance, may trigger a mechanism of the NSD to move the sleeve such that it covers the needle. Typically, a NSD comprises an initially tensioned spring and a release structure interacting with the moving plunger rod. Once the plunger rod is moved for pushing the drug substance out of the syringe via the needle to a sufficient extent, the release structure activates the spring which pushes the sleeve to be moved aside or around the needle.

The needle safety device activation force, can be the force needed to trigger a mechanism of the NSD of a syringe arrangement, such that a release structure is activated by the syringe plunger movement to make the needle inaccessible once the pharmaceutical substance has been injected.

The needle safety device activation force part of the syringe arrangement surrogate preferably comprises a connector arranged to contact the intermediate plunger assembly of the injection force part when being advanced by the force testing machine. To this purpose, the connector can be plunger or rod shaped and it can extend into the axial direction.

Preferably, the needle safety device activation force part of the syringe arrangement surrogate comprises a body which releasably holds the connector with a force corresponding to the needle safety device activation force of the syringe arrangement.

By further equipping the FTM validation apparatus with the needle safety device activation force part, syringe arrangement having such NSD can be simulated more accurately. This may improve the overall quality of the validation for many types of syringe arrangements.

In order to achieve the releasable holding between connector and body, the connector is preferably equipped with a third magnetic element and the body is equipped with a fourth magnetic element, wherein the connector is held by the body by means of a magnetic force acting between the third magnetic element and the fourth magnetic element.

Preferably, the needle safety device activation force part of the syringe arrangement surrogate comprises a final spring arranged to be deformed when the connector is moved in the axial direction. The body of the needle safety activation part may comprise a hollow interior housing the final spring and integrating an opening through which the connector is providable towards the final spring.

Another aspect of the invention relates to a method of validating a test process involving a force testing machine to measure forces involved in operation of a syringe arrangement. The method comprises the steps of: obtaining a FTM validation apparatus as above described; customizing the FTM validation apparatus to the properties of the syringe arrangement; adjusting the force testing machine according to the syringe arrangement; providing the FTM validation apparatus into the force testing machine, and operating the force testing machine for a predefined number of cycles. Such a method allows for efficiently achieving the effects and benefits described above in connection with the FTM validation apparatus and its preferred embodiments.

Preferably, customizing the FTM validation apparatus comprises preliminary steps of evaluating a break loose force of the syringe arrangement; an injection force of the syringe arrangement and a needle safety device activation force of the syringe arrangement. Once these forces have been evaluated, the customization of the adjustment of the force testing machine can be finalized in accordance with the evaluated break loose force, the evaluated injection force and the evaluated needle safety device activation force.

Customizing the FTM validation apparatus to the properties of the syringe arrangement may comprise the step of simulating a break loose force and/or an injection force and/or a needle safety device activation force of the syringe arrangement by generating a respective magnetic force and/or spring force.

Preferably, generating a magnetic force as above introduced comprises adjusting the force strength by an interposition of an adjustable spacer structure between a first magnetic element and a second magnetic element configured to create the magnetic force. The spring force(s) can be adjusted by choosing and/or appropriately pre-tensioning the respective spring(s).

A further other aspect of the invention relates to a method of measuring forces involved in an operation of a syringe arrangement. Such method comprises the steps of defining a test process using a force testing machine; validating the test process according to a validation method as above described; and testing the syringe arrangement in the validated test process.

A still further other aspect of the invention relates to a use of a FTM validation apparatus as described above for validating a test process using a force testing machine to measure forces involved in operation of a syringe arrangement. Such a use allows for efficiently achieving the effects and benefits described above in connection with the FTM validation apparatus and its preferred embodiments.

BRIEF DESCRIPTION OF THE DRAWINGS

The force testing machine validation apparatus according to the invention, and the method of validating a test process involving a force testing machine by such a FTM validation apparatus according to the invention are described in more detail herein below by way of an exemplary embodiment and with reference to the attached drawings, in which:

FIG. 4 shows a cross section of an injection force part of the syringe arrangement surrogate of FIG. 2C;

FIG. 5 shows a cross section of a needle safety device activation force part of the syringe arrangement surrogate of FIG. 2C;

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
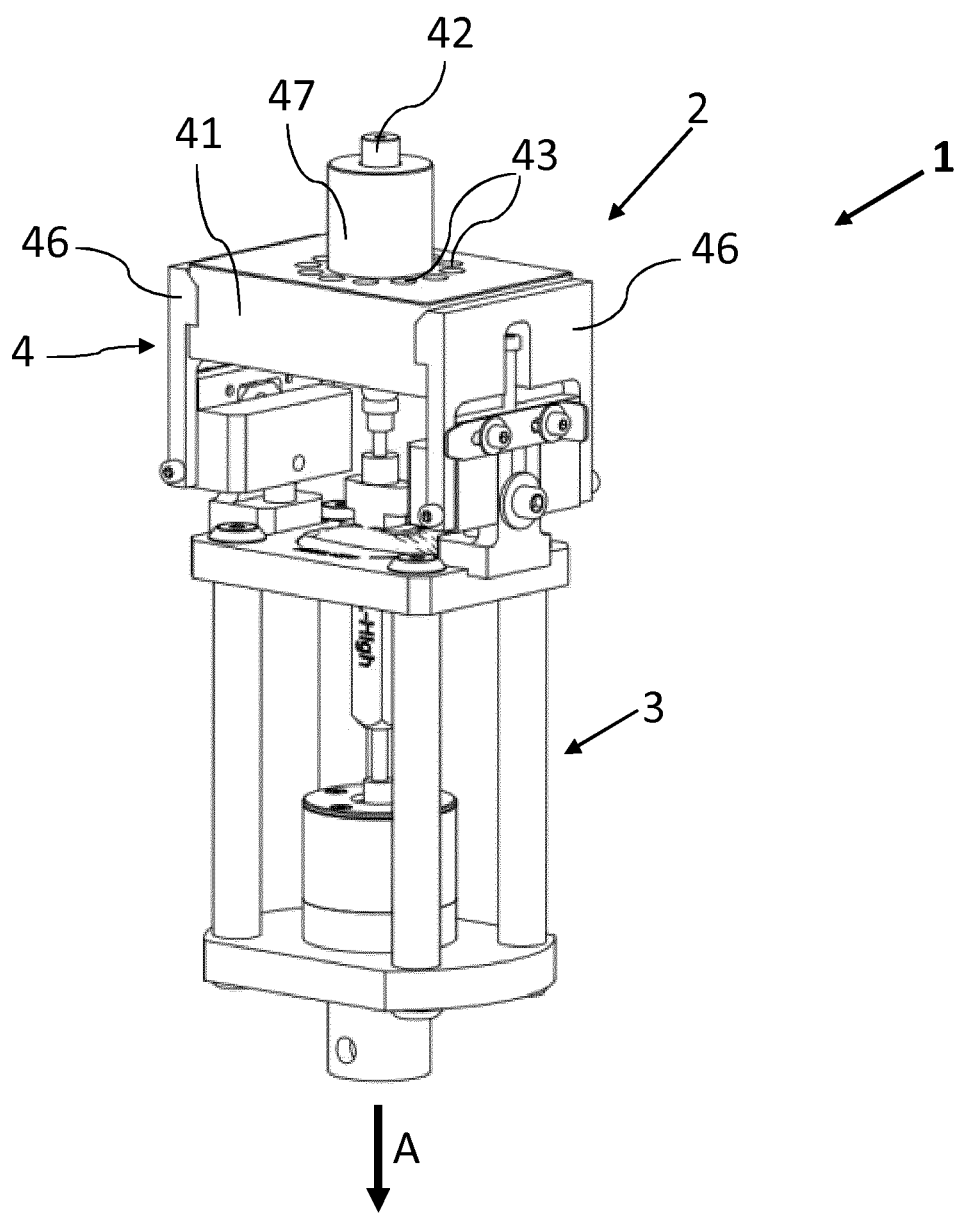
FIG. 1 shows a perspective view of an embodiment of a force testing machine (FTM) validation apparatus according to the present invention.
Figure 7:
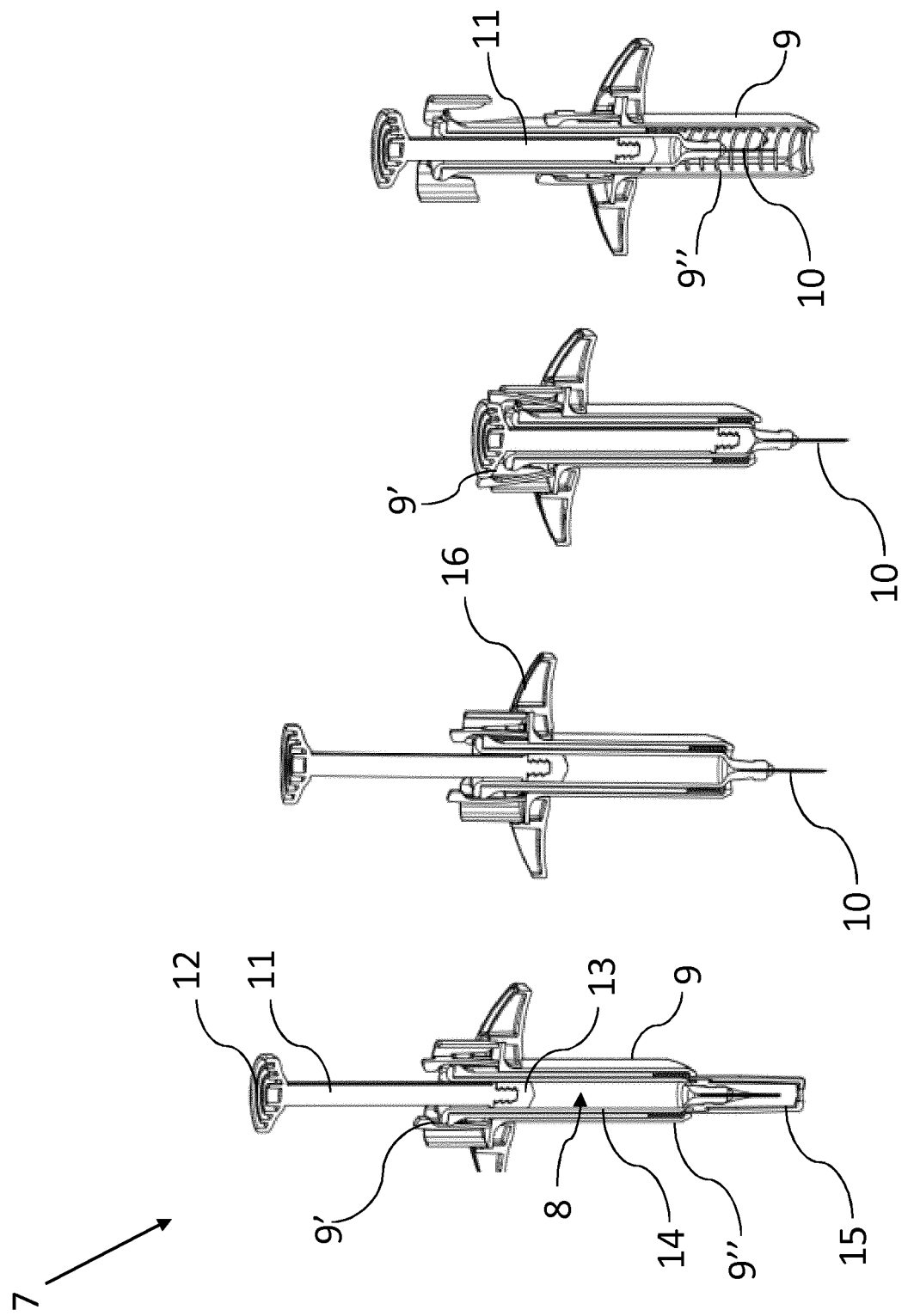
FIG. 7 shows a sequence of perspective cross-section views of a syringe arrangement, which can be equivalently simulated by the syringe arrangement surrogate of FIGS. 2A, 2B and 2C, showing respective configurations taken by the syringe arrangement from an initial state where a syringe plunger is extended and a syringe needle is protected by a rigid needle shield, to a final configuration where the plunger has been pushed to empty the syringe barrel via the needle and a mechanism of a needle safety device has been triggered to cover the needle.

With initial reference to FIG. 1, a force testing machine (FTM) validation apparatus 1 according to the present invention is shown, especially conceived for validating a test process involving a force testing machine to measure forces involved in operation of a syringe arrangement 7 such as the one represented in FIG. 7.

Relatively to the specific embodiment represented, the FTM validation apparatus 1 of FIG. 1 is particularly adapted to measure forces in connection with the syringe arrangement 7 which comprises a staked-in needle prefilled syringe 8 and a needle safety device 9, 9', 9" cooperating with the staked-in needle prefilled syringe 8 as represented in FIG. 7.

The FTM validation apparatus 1 comprises a syringe arrangement surrogate 2, as it will be more in detail explained in connection with FIGS. 2A-2C; and a holder 3 arranged to support the syringe arrangement surrogate 2 in a predefined position and orientation in the FTM.

The syringe arrangement surrogate 2 and the holder 3 extend along a substantially corresponding longitudinal, or axial, direction A. Also, the FTM validation apparatus 1 is designed so that the axial direction A substantially corresponds to the general direction of movement of its components which are configured to simulate the operation of the syringe arrangement 7.

Figure 6:
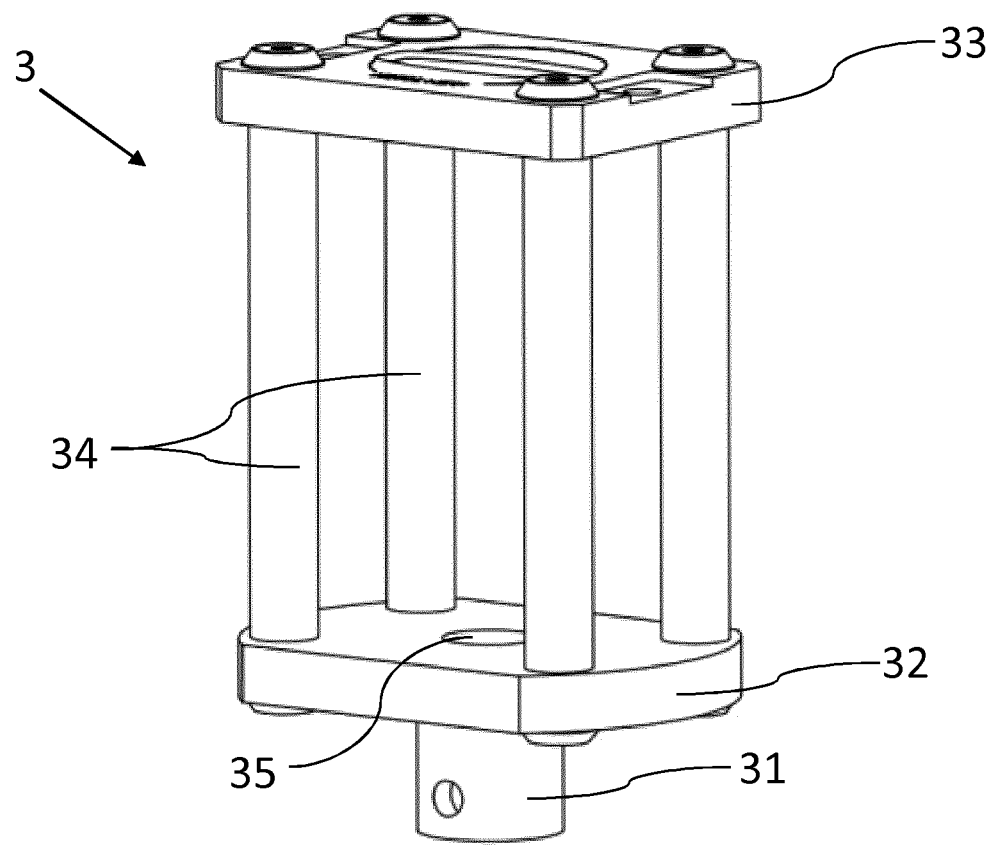
FIG. 6 shows a holder arranged to support the syringe arrangement surrogate of FIG. 1 when validating a test process involving a FTM and to support the syringe arrangement when testing the syringe arrangement in the FTM.

As shown in FIG. 6, the holder 3 may comprise a connector 31 for accurate positioning in the FTM. The holder 3 may further comprise a base plate 32 and a top plate 33, which are held in place by a multiplicity of posts 34 extending along the axial direction A. The connector 31 can advantageously be integral with the base plate 32. The base plate 32 also integrates a socket 35 which is configured to receive and stabilize a proximal portion of the syringe arrangement surrogate 2. The top plate 33 incorporates a connection to the syringe arrangement surrogate 2. Different top plates 33 and/or base plates 32 can be mounted at respective extremities of appropriately elongated posts 34, in order to accommodate and test syringe arrangement surrogates mimicking respectively differently sized syringe arrangements. By way of example, different sets of base and/or top plates and/or posts can be employed to simulate syringe arrangements containing respectively 1.0 millilitre or 2.25 millilitres. Advantageously, the same holder 3 used with the FTM validation apparatus 1 is also used in the testing process. Therefore, it is embodied to carry the syringe arrangement 7 to be tested in the validated testing process. For example, the top plate 33 can be equipped with a recess corresponding to the finger flange of the syringe arrangement 7 to be tested. Such holder 3 allows for including its appropriate functioning in the validation process.

Figure 2A:
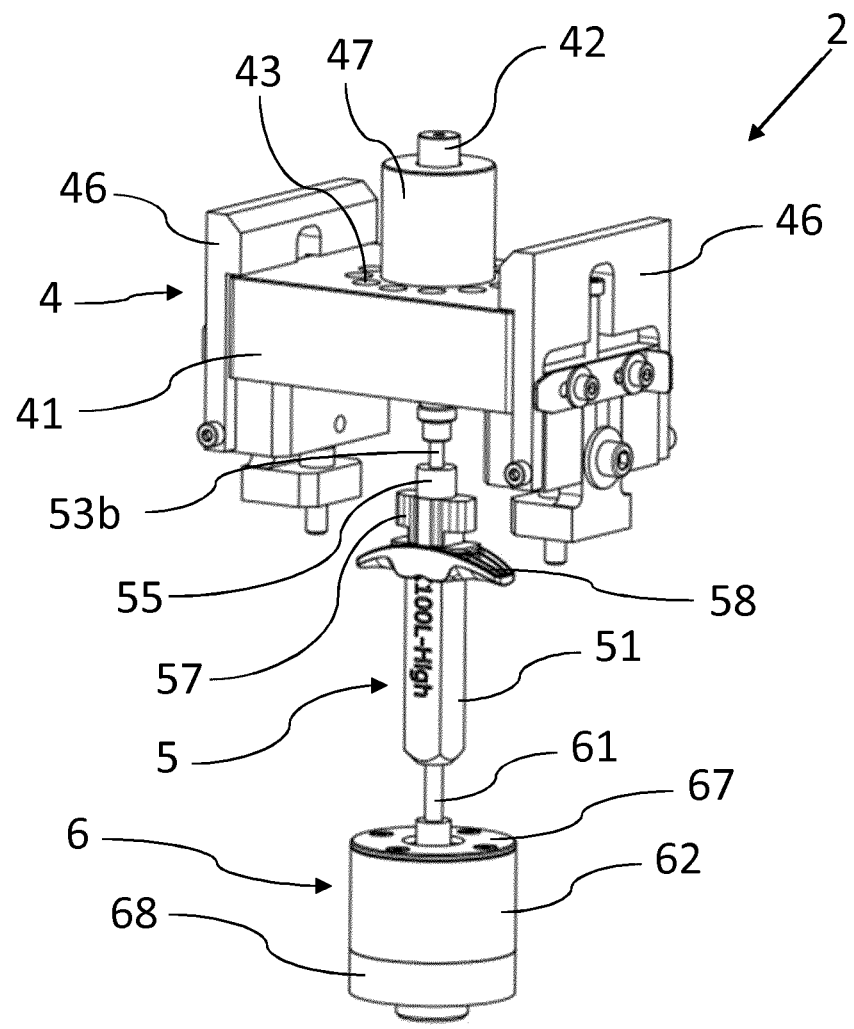
FIG. 2A shows a perspective view of a syringe arrangement surrogate of the FTM validation apparatus of FIG. 1 equipped with a support structure for holding a break loose force part of the syringe arrangement surrogate in a predefined position relative to other parts of the FTM validation apparatus.
Figure 2C:
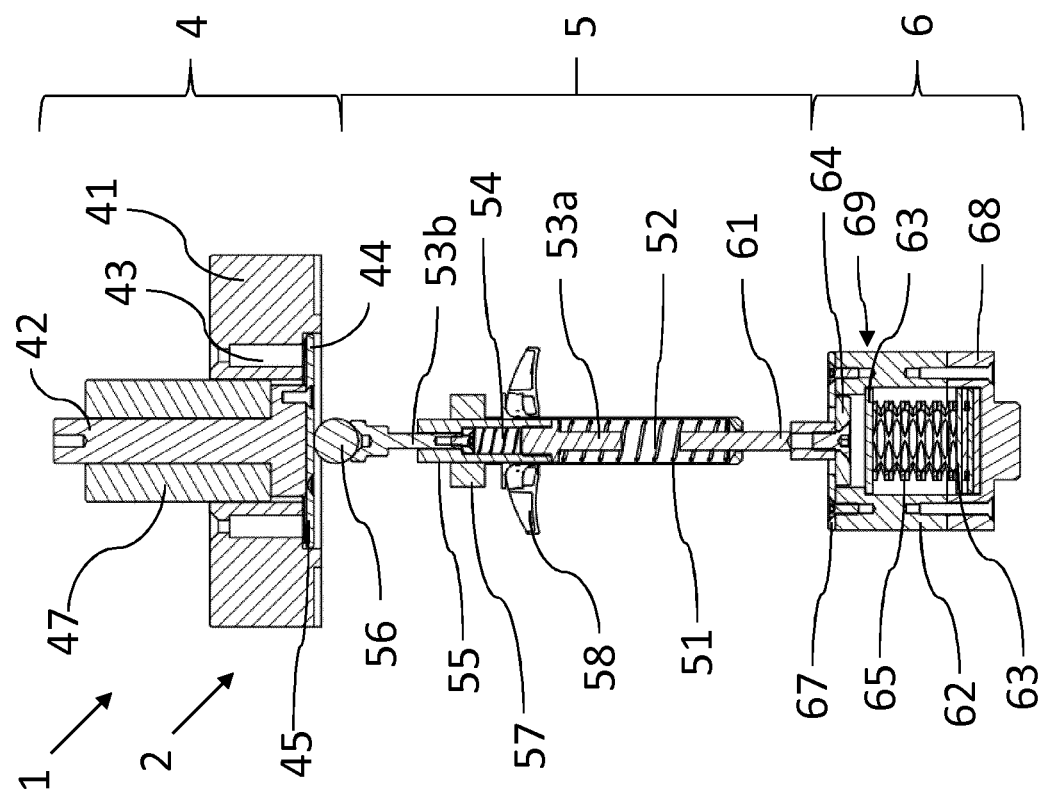
FIG. 2C shows a cross section of the syringe arrangement surrogate of the FTM validation apparatus of FIG. 1.
Figure 2B:
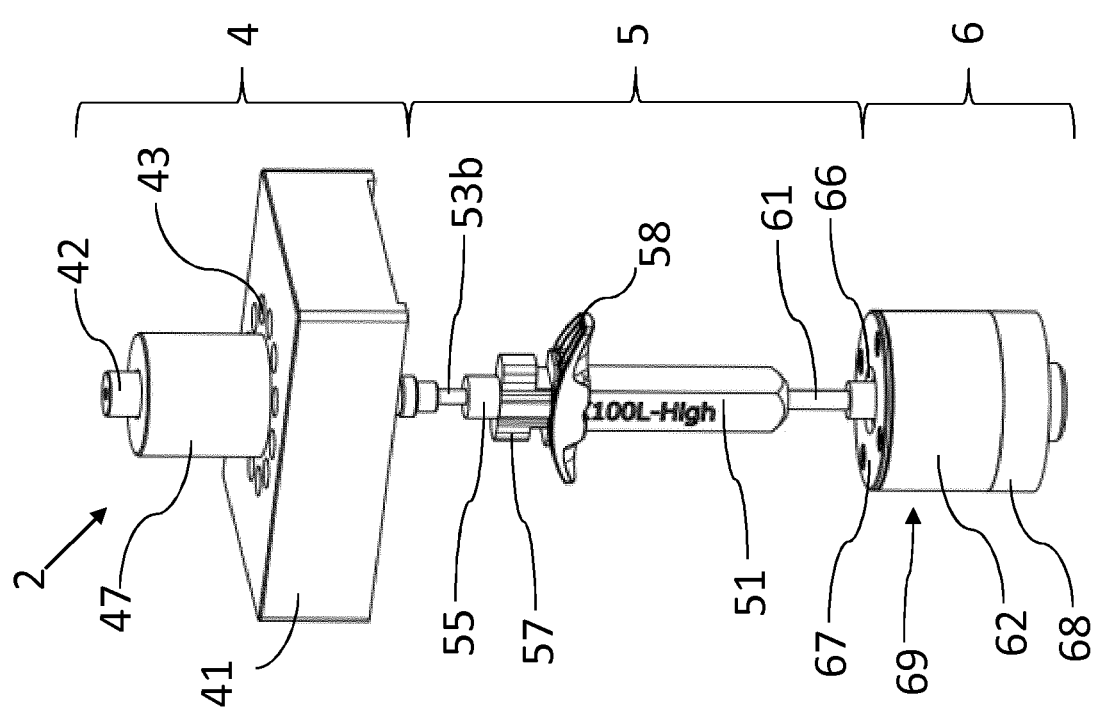
FIG. 2B shows a perspective view of the syringe arrangement surrogate of the FTM validation apparatus of FIG. 1 without the support structure shown in FIG. 2A.

With reference to FIGS. 2A-2C, the syringe arrangement surrogate 2 comprises a break loose part 4, arranged to mimic a break loose force of the syringe arrangement 7, and an injection force part 5, arranged to mimic an injection force of the syringe arrangement 7.

Figure 3:
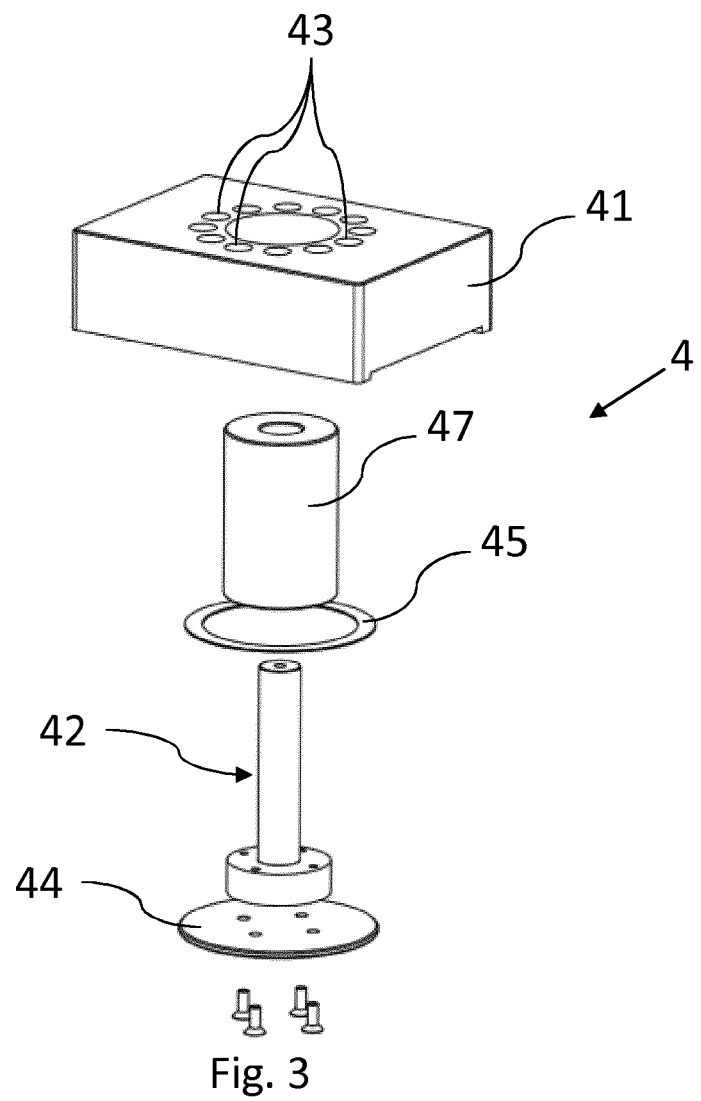
FIG. 3 shows an exploded view of a break loose part of the syringe arrangement surrogate of FIG. 2B.

With particular reference to FIG. 3, the break loose part 4 has a carrier 41 and a distal plunger 42 movable relative to the carrier 41 in the axial direction A. The plunger 42 is connected to the carrier 41 such that it is releasable by applying a force corresponding to the break loose force of the syringe arrangement 7.

FIGS. 2C and 3 show how the carrier 41 is equipped with a first magnetic element 43, whereas the distal plunger 42 has a second magnetic element 44. Thus, the distal plunger 42 is connected to the carrier 41 by a magnetic force acting between the first magnetic element 43 and the second magnetic element 44.

Relative to the specific embodiment represented, the distal plunger 42 incorporates, or is attached to, a metal disc 44, and the carrier 41 is provided with an array of cylindrical magnets 43 or similar, accommodated into the body of the carrier 41 in dedicated recesses, or slots. The recesses designed to receive the cylindrical magnets 43 are distributed according to a substantially circumferential pattern around the bore letting the plunger 42 slide through. The magnitude of the magnetic force acting between the metal disc 44 and the cylindrical magnets 43 can be thus also customized based on the number of cylindrical magnets introduced in the carrier 41, according to a modular concept.

Moreover, the break loose part 4 of the syringe arrangement surrogate 2 comprises an adjustable spacer structure 45 arranged between the first magnetic element 43 of the carrier 41 and the second magnetic element 44 of the distal plunger 42. A distance between the first magnetic element 43 of the carrier 41 and the second magnetic element 44 of the distal plunger 42 is therefore made adjustably predefinable. Consequently, a further flexibility is offered in the calibration of the magnetic force acting between the metal disc 44 and the cylindrical magnets 43. As explained, such a spacer structure 45 allows for efficiently adapting or adjusting the break loose force of the FTM validation apparatus 1 to the situation given in the syringe arrangement 7 to be mimicked. Thereby, the spacer structure 45 can comprise a set of plates or sheets, for instance Mylar discs, arrangeable between the first and second magnetic elements 43, 44.

In FIGS. 1 and 2A it is shown that the break loose part 4 of the syringe arrangement surrogate 2 comprises a support structure 46 fixedly holding the carrier 41. The support structure 46 is mounted such that the break loose part 4 and the injection force part 5 are held in a predefined relationship to each other which reflects, or is characteristic of, the simulated syringe arrangement 7.

In fact, the support structure 46 is adjustable to accommodate differently embodied syringe arrangement surrogates 2, configured to simulate corresponding differently embodied syringe arrangements 7. The support structure, in the form of two side supports 46 of the carrier 41, is engineered to compensate the back pressure coming from the operation of the injection force part 5. Moreover, the support structure can comprise a slide mechanism which locks relative rotation and prevents the reciprocal slipping of carrier and supports 46, under load.

The break loose part 4 comprises also a distal sleeve 47 mounted to the carrier 41 in an axially displaceable manner, wherein the distal plunger 42 axially extends through the distal sleeve 47 when being connected to the carrier 41. The sleeve 47 has a stabilizing effect on the plunger 42.

With particular reference to FIGS. 2C and 4, the injection force part 5 of the syringe arrangement surrogate 2 has a spring 52, an outer sleeve 51 housing the spring 52 and an intermediate plunger assembly extending into the outer sleeve 51. A first rod member 53a of the intermediate plunger assembly is movable relative to the outer sleeve 51 in an axial direction A and the spring 52 is arranged to be deformed when the first rod member 53a is moved in the axial direction A into the outer sleeve 51. Advantageously, the outer sleeve 51, the rod member 53a and the spring 52 cooperate to closely reproduce the fluid dynamic resistance, or drag, exerted by the pharmaceutical substance, located inside the syringe body 14 of the syringe arrangement 7, on account of its viscosity.

Moreover, the intermediate plunger assembly of the injection force part 5 has a further spring 54, an inner sleeve 55 housing the further spring 54 and a second rod member 53b extending into the inner sleeve 55. The second rod member 53b is movable relative to the inner sleeve 55 in the axial direction A and the further spring 54 is arranged to be deformed when the second rod member 53b is moved in the axial direction A into the inner sleeve 55. Advantageously, the inner sleeve 55, the second rod member 53b and the further spring 54 cooperate to simulate the friction between the plunger stopper 13 and the internal walls of a syringe body 14 of the syringe arrangement 7, which especially needs to be overcome to initiate the movement of the plunger 11. Additionally, this structure allows for mimicking the plunger movement prior the liquid to be dispensed is reached. In particular, the compression of an air bubble in the syringe arrangement 7 before the liquid is dispensed can be simulated.

The intermediate plunger assembly is also equipped with a rounded distal end portion 56. In this case, the distal end portion 56 is formed by a spherical ball with a diameter of 12 millimeter, which is loosely or movably held in a respective concave recess of the second rod member 53b. Such rounded distal end portion 56 or ball allows for simulating a human interface such as a finger or the like and it therefore allows for balancing deviations or inclinations of the syringe plunger 11. The spherical distal end portion 56 of the intermediate plunger assembly of the injection force part 5 contacts a proximal end of the distal plunger 42 of the break loose part 4, when the holder 3 supports the syringe arrangement surrogate 2 in the predefined position and orientation in the force testing machine. In particular, in the shown configuration, the spherical distal end portion 56 contacts the second magnetic element 44.

Under the load applied by the plunger 42 via the magnetic element 44 detaching from the carrier 41, the second rod member 53b moves relative to the inner sleeve 55, before the first rod member 53a starts moving relative to the outer sleeve 51. The movement of the first rod member 53a is actually induced by the advancement of the second rod member 53b and triggered by establishing sufficient pressure from the second rod member 53b to the first rod member 53a via the compressed further spring 54 or by the second rod member 53b abutting the inner sleeve 55, which is in contact with first rod member 53a, whatever happens earlier. After the sufficient pressure or abutting therebetween is established, the first rod member 53a and the second rod member 53b move together substantially integrally. By advancing in the axial direction A, the second rod member 53b can also drag the inner sleeve 55, which comes to move within the outer sleeve 51, up to the point when the first rod member 53a abuts a connector 61 of the needle safety device activation force part 6. In this configuration, the inner sleeve 55 is made slidable within the outer sleeve 51, which has a first protrusion 57 at its top end. Furthermore, the outer sleeve 51 is equipped with a second protrusion 58 designed to be equivalent to an extended finger flange 16 of the respective syringe arrangement 7.

Furthermore, the syringe arrangement surrogate 2 comprises a needle safety device activation force part 6, arranged to mimic a needle safety device activation force of the syringe arrangement 7.

The needle safety device activation force part 6 comprises a stamp like or T-shaped connector 61 arranged to contact the intermediate plunger assembly of the injection force part 5 when being advanced by the force testing machine. Relatively to the represented embodiment, as shown in FIG. 2C, the connector 61 comprises a rod-like part which is configured to slide within the outer sleeve 51 of the injection force part 5. The load from the force testing machine is transmitted to the connector 61 when first rod member 53a abuts the connector 61 which presses it outwardly of the outer sleeve 51.

With reference to FIG. 5, the needle safety device activation force part 6 of the syringe arrangement surrogate 2 comprises a body 69 which is arranged to releasably hold the connector 61 with a force corresponding to the needle safety device activation force. The body 69 has cylindrical portion 62 with a hollow interior which is closed at its upper end by a top plate 67 fixed to the cylindrical portion 62 by screws and at its lower end by a bottom plate 68 fixed to the cylindrical portion 62 by screws and pins. For providing the mentioned force corresponding to the needle safety activation device, the connector 61 is equipped with a horizontal plate-like third magnetic element 64. Thereby, the connector 61 is held relative to the body 69 by means of a magnetic force acting between the third magnetic element 64 and the top plate 67 which, like this, forms a fourth magnetic element stationary to the body 69. In FIG. 5, the needle safety device activation part 6 is shown in a state where the needle safety activation force is overcome already, i.e. the third magnetic element 64 is released from the top plate 67 and moved downwardly. The situation where the third magnetic element 64 is still connected to the top plate 67 and, thus, the needle safety activation force is not yet overcome, can be seen in FIG. 2C.

The needle safety device activation force part 6 of the syringe arrangement surrogate 2 comprises a final spring 65 arranged to be deformed when the connector 61 is moved in the axial direction A. The hollow interior of the body 69 houses the final spring 65 wherein it is clamped in between pre-tensioning disks 63 located on the bottom plate 68 and a pre-tensioning disk 63 located below the third magnetic element 64. The pre-tensioning disks 63 are made of a non- or low-magnetic material such as Aluminium or the like for preventing a magnetic force acting between it and the third magnetic element 64. In the top plate 67 an opening 66 is provided through which the rod-like part of the connector 61 extends towards the final spring 65.

In FIG. 7, the functioning of a needle safety device in connection with subsequent phases of an operation of a syringe arrangement 7 comprising a syringe 8 is shown. The needle safety device comprises a guard body 9; a spring 9" deployed between the guard body 9 and the syringe barrel 14; and a release structure comprising a system of elastic fingers 9'. When the plunger 11 is still extended in its initial distal position outside of the syringe barrel 14 and the pharmaceutical substance has not yet been delivered, the guard body 9 fits over the syringe barrel 14 and the spring 9" is in a compressed state. When it is intended to perform an injection, the needle shield 15 is removed and the plunger 11 is pushed forward in a proximal direction towards the needle 10 by applying pressure to a plunger flange 12. The plunger 11 is moved for pushing the pharmaceutical substance out of the syringe 8 via the needle 10, until the injection of the full dose has been completed. Consequently, the release structure activates, triggered by deformation of the elastic fingers 9', and the spring 9" expands pushing the syringe 8 back so that the needle 10 comes to be fully protected and covered by the guard body 9.

Customized based on the characteristics of the syringe arrangement to be simulated, the FTM validation apparatus according to the present invention allows to replicate the full range of forces involved in the operation of such syringe arrangement, in each of the break loose force region, injection force region and needle safety device activation force region.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A force testing machine (FTM) validation apparatus for validating a test process using a force testing machine to measure forces involved in operation of a syringe arrangement, particularly a syringe arrangement including a staked-in needle prefilled syringe and a needle safety device cooperating with the staked-in needle prefilled syringe, the FTM validation apparatus comprising:
   a syringe arrangement surrogate; and
   a holder arranged to support the syringe arrangement surrogate in a predefined position and orientation in the force testing machine,
   wherein the syringe arrangement surrogate comprises a break loose part arranged to mimic a break loose force of the syringe arrangement and an injection force part arranged to mimic an injection force of the syringe arrangement; and
   wherein the break loose part of the syringe arrangement surrogate has a carrier and a distal plunger movable relative to the carrier in an axial direction, and the distal plunger is connected to the carrier such that the distal plunger is releasable by applying a force corresponding to the break loose force of the syringe arrangement.

2. The FTM validation apparatus according to claim 1, wherein the carrier of the break loose part of the syringe arrangement surrogate is equipped with a first magnetic element and the distal plunger of the break loose part of the syringe arrangement surrogate has a second magnetic element, wherein the distal plunger is connected to the carrier by a magnetic force acting between the first magnetic element and the second magnetic element.

3. The FTM validation apparatus according to claim 2, wherein the break loose part of the syringe arrangement surrogate comprises an adjustable spacer structure arranged between the first magnetic element of the carrier and the second magnetic element of the distal plunger, such that a distance between the first magnetic element of the carrier and the second magnetic element of the distal plunger is adjustably predefinable.

4. The FTM validation apparatus according to claim 1, wherein the syringe arrangement surrogate comprises a support structure mountable to the holder.

5. The FTM validation apparatus according to claim 4, wherein the support structure is adjustable to accommodate differently dimensioned syringe arrangement surrogates configured to simulate corresponding differently dimensioned syringe arrangements.

6. The FTM validation apparatus according to claim 1, wherein the break loose part of the syringe arrangement surrogate comprises a distal sleeve, wherein the distal plunger axially extends through the distal sleeve when being connected to the carrier.

7. A method of validating a test process using a force testing machine to measure forces involved in operation of a syringe arrangement, comprising:
   obtaining a FTM validation apparatus according to claim 1;
   customizing the FTM validation apparatus to the properties of the syringe arrangement;
   adjusting the force testing machine according to the syringe arrangement;
   providing the FTM validation apparatus into the force testing machine; and
   operating the force testing machine for a predefined number of cycles.

8. A method of operating a force testing machine validation apparatus according to claim 1 for validating a test process using a force testing machine to measure forces involved in operation of a syringe arrangement.

9. A force testing machine (FTM) validation apparatus for validating a test process using a force testing machine to measure forces involved in operation of a syringe arrangement, particularly a syringe arrangement including a staked-in needle prefilled syringe and a needle safety device cooperating with the staked-in needle prefilled syringe, the FTM validation apparatus comprising:
   a syringe arrangement surrogate; and
   a holder arranged to support the syringe arrangement surrogate in a predefined position and orientation in the force testing machine,
   wherein the syringe arrangement surrogate comprises a break loose part arranged to mimic a break loose force of the syringe arrangement and an injection force part arranged to mimic an injection force of the syringe arrangement; and
   wherein the injection force part of the syringe arrangement surrogate has a spring, an outer sleeve housing the spring, and an intermediate plunger assembly extending into the outer sleeve, wherein a first rod member of the intermediate plunger assembly is movable relative to the outer sleeve in an axial direction and the spring is arranged to deform when the first rod member is moved in the axial direction into the outer sleeve.

10. The FTM validation apparatus according to claim 9, wherein the intermediate plunger assembly of the injection force part has a further spring, an inner sleeve housing the further spring, and a second rod member extending into the inner sleeve, wherein the second rod member is movable relative to the inner sleeve in the axial direction and the further spring is arranged to deform when the second rod member is moved in the axial direction into the inner sleeve.

11. The FTM validation apparatus according to claim 9, wherein the intermediate plunger assembly is equipped with a rounded distal end portion.

12. The FTM validation apparatus according to claim 11, wherein the intermediate plunger assembly comprises a ball lying on the second rod member and thereby forming the rounded distal end portion.

13. The FTM validation apparatus according to claim 11, wherein the distal end portion of the intermediate plunger assembly of the injection force part contacts a proximal end of a distal plunger of the break loose part, when the holder supports the syringe arrangement surrogate in the predefined position and orientation in the force testing machine.

14. A force testing machine (FTM) validation apparatus for validating a test process using a force testing machine to measure forces involved in operation of a syringe arrangement, particularly a syringe arrangement including a staked-in needle prefilled syringe and a needle safety device cooperating with the staked-in needle prefilled syringe, the FTM validation apparatus comprising:
  a syringe arrangement surrogate; and
  a holder arranged to support the syringe arrangement surrogate in a predefined position and orientation in the force testing machine,
  wherein the syringe arrangement surrogate comprises a break loose part arranged to mimic a break loose force of the syringe arrangement and an injection force part arranged to mimic an injection force of the syringe arrangement; and
  wherein the syringe arrangement surrogate comprises a needle safety device activation force part arranged to mimic a needle safety device activation force of the syringe arrangement.

15. The FTM validation apparatus according to claim 14, wherein the needle safety device activation force part of the syringe arrangement surrogate comprises a connector arranged to contact an intermediate plunger assembly of the injection force part when being advanced by the force testing machine.

16. The FTM validation apparatus according to claim 15, wherein the needle safety device activation force part of the syringe arrangement surrogate comprises a final spring arranged to deform when the connector is moved in the axial direction.

17. The FTM validation apparatus according to claim 16, wherein a body of the needle safety device activation force part comprises a hollow interior housing the final spring and an opening through which the connector is movable towards the final spring.

18. The FTM validation apparatus according to claim 15, wherein the needle safety device activation force part of the syringe arrangement surrogate comprises a body which releasably holds the connector with a force corresponding to the needle safety device activation force.

19. The FTM validation apparatus according to claim 18, wherein the connector is equipped with a third magnetic element and the body is stationary to a fourth magnetic element, wherein the connector is held by the body by means of a magnetic force acting between the third magnetic element and the fourth magnetic element.

20. A method of validating a test process using a force testing machine to measure forces involved in operation of a syringe arrangement, comprising:
  obtaining a FTM validation apparatus according to claim 14;
  customizing the FTM validation apparatus to the properties of the syringe arrangement;
  adjusting the force testing machine according to the syringe arrangement;
  providing the FTM validation apparatus into the force testing machine; and
  operating the force testing machine for a predefined number of cycles.

* * * * *